United States Patent Office 3,266,246
Patented August 16, 1966

3,266,246
BINARY VAPOR GENERATING SYSTEMS FOR ELECTRIC POWER GENERATION
Laszlo Heller and Laszlo Forgo, Budapest, Hungary, assignors to "Licencia" Találmányokat Értékesitö Vállalat, Budapest, Hungary, a firm
Filed Feb. 1, 1963, Ser. No. 255,628
8 Claims. (Cl. 60—38)

This invention relates to binary and trinary vapor generating systems for the generation of electric power by conversion of heat energy into mechanical energy and, more particularly, to an improved vapor generating system of this type in which cold air may be used efficiently for condensing the exhaust vapor of the lowest temperature stage.

It is well known to use binary vapor generating systems for the purpose of generating electrical energy by converting heat energy into mechanical energy, such systems involving the use of two separately circulating fluid media having different thermal characteristics. In the most usual case, the lower temperature stage utilizes water and water vapor ($H_2O$) as the circulating medium, while the higher temperature stage utilizes another fluid as the circulating medium.

The purpose in utilizing binary vapor generating systems is to enhance the thermal efficiency of conversion of heat energy into mechanical energy. Such thermal efficiency increases with a decrease in the mean exhaust temperature of the fluid medium and increases with an increase in the mean heat input temperature. Expressed another way, the thermal efficiency is a direct function of the differential between the mean heat input temperature and the mean exhaust temperature of the system.

If the term "isothermally" is used to indicate a heat content at a constant temperature, then the mean exhaust temperature is at its lowest value when it corresponds as closely as possible to the ambient external atmospheric conditions, such as temperature and pressure, and most importantly by the temperature and quantity of the available cooling water. In the case where water and water vapor ($H_2O$) is utilized as the circulating medium, the condition of minimum mean exhaust temperature occurs without recourse to any special means, since condensation is effected isothermally in the condenser of the steam turbine, and the temperature prevailing in such a condenser is lowest under the given conditions related to ambient atmospheric pressure and temperature.

On the other hand, when water and water vapor is used as a circulating medium, the mean or average temperature of the heat input remains substantially below the minimum value governed by the temperature characteristics or thermal resistances of the materials employed in the system. This limiting value is, as a matter of fact, attained only at a single point in the circulating system, namely at the outlet of the superheater. The overall heat input, on the contrary, varies over a wide range of temperatures. Thus, the heat input temperature increases by degrees from the feed water temperature to the saturation temperature, remains constant during vaporization, at a constant saturation temperature, and is increased in the superheater from the saturation temperature to the superheater outlet temperature. Necessarily, therefore, the mean or average temperature of the heat input remains substantially below the maximum temperature within the system. As a result, a satisfactory thermal efficiency, with respect to the mean temperature of the heat input, cannot be attained in a water-vapor circulating or generating system.

Accordingly, there has been a demand for a system in which the mean temperature of the heat input corresponds to the maximum temperature possible considering the thermal resistance and high temperature characteristics of the materials employed in the system. In this connection, it has been proposed to employ a circulating medium whose critical point is substantially above the limiting temperature value determined by the thermal resistance or high temperature characteristics of the materials employed, and in which the heat input to the system is supplied in the form of heat of vaporization, which means that it is supplied isothermally. As an example of such a circulating medium, mercury may be mentioned, as its critical point is substantially in excess of 1000° C., and it boils, for example, at a temperature of 500° C. even at as low a pressure as ten atmospheres.

Although a mercury vapor-water vapor ($Hg-H_2O$) binary vapor generating system makes it possible to operate at the maximum limiting temperature determined by the thermal resistance or high temperature characteristics of the materials of the system, it is not capable of providing a solution of problems arising in the most recent developments in power generating stations. The latest developments in power generating stations is to utilize what is known as "air condensation," wherein condensation is effected by the use of atmospheric air, rather than by the use of cooling water.

On the other hand, the objective in the design of steam turbines is to attain the maximum possible output per unit. At the present time, the outputs per unit are in the range of 500 to 600 megawatts, but this unit output will probably be increased to an even higher level in the near future.

As even in the coldest weather, the lower temperature limit of water cooled condensers is still slightly above 0° C. and, in actual practice, is substantially above 0° C., due to other factors to be considered, it will be appreciated that substantially lower condensation temperatures are possible using ambient atmospheric air as a cooling medium. However, reduction of the temperature of the water temperature to values below 0° C. is inhibited not only by the danger of freezing of the water, which would block its circulation, but more importantly by the fact that extremely low temperatures are associated with vacuum values which, in practice, cannot be maintained in water cooled condensers.

Another inhibiting factor is the fact that the specific volume of the exhaust steam increases so substantially at such low pressures that the output or discharge losses are at unacceptable high levels even when the lengths of the turbine blades are increased to the maximum possible from the standpoint of the strength of the materials used. Thus, the increase in the discharge losses would be greater than any gain made possible by an increase in the temperature gradient effected by a drop in the condenser pressure or in the condensation temperature, thus resulting in a drop in the efficiency.

In view of the foregoing circumstances, the general practice, at present, is to determine the suitable minimum pressure at 0.02 absolute atmosphere in the case of, for example, a turbine having an output of the order of magnitude of 100 megawatts. This value is inapplicable for turbines having higher unit outputs, as the exhaust steam volume at such a pressure would have a value so large that the discharge losses would be excessive, even with the use of turbine blades having the maximum length permissible. Thus, though a minus 30° condensation temperature theoretically could be attained, with air condensation, it has not been possible to do so with known binary vapor systems for the aforementioned reasons.

In accordance with the present invention, the aforementioned deficiencies of known binary vapor systems are eliminated by the provision of a binary or trinary vapor generating system wherein it is possible to utilize a condensation temperature as low as desired, and wherein it is further possible to utilize the lowest prevailing ambient atmospheric temperature even in the case of turbines having unit outputs in excess of 500 to 600 megawatts. Not only is the binary or trinary vapor generating system of the invention free of the problems associated with known binary vapor generating systems, but also a number of additional technical advantages are attained thereby.

More specifically, in accordance with the present invention, a binary vapor generating system is provided in which, instead of using water-vapor ($H_2O$) as the circulating medium in the lowest temperature stage, there is used therein a circulating fluid medium whose critical temperature is lower than that of water and whose freezing point is below even the lowest prevailing ambient atmospheric temperatures.

For an understanding of the principles of the invention, reference is made to the following description of a typical embodiment thereof as illustrated in the accompanying drawing. In the drawing.

As an example of the principles of the invention, the illustrated binary vapor generating system utilizes water-vapor as the circulating medium of the higher temperature stage. However, it should be understood that it is possible to provide a third and even higher temperature stage, such as a stage utilizing mercury as the circulating medium. In either case, the lowest temperature stage utilizes a circulating medium whose critical point is below that of water so that, even in the temperature range of about minus 30° C. to minus 40° C., its saturation pressure corresponding to the ambient atmospheric temperature is in excess of 0.05 absolute atmosphere. Among circulating media of this type are the so-called "cold vapors" or "refrigerants," which include ammonia, carbon dioxide, various Freon compounds, and the like. These refrigerants or refrigerating media have the advantageous property that the specific volumes of their vapors are very small even at the lowest prevailing values of ambient temperatures. Thus, they can be utilized with turbines having very much smaller dimensions than those necessary in a system utilizing water-vapor ($H_2O$) as the circulating medium.

Figures 1, 2:
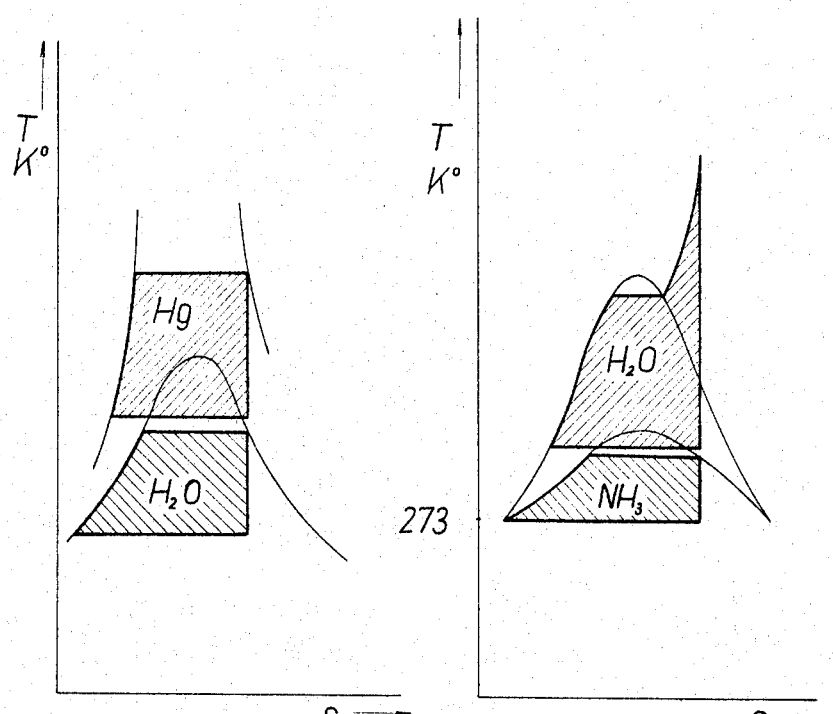
FIG. 1 is an entropy-temperature diagram of a binary vapor generating system utilizing mercury and water-vapor ($H_2O$) as the circulating media.
FIG. 2 is the entropy-temperature diagram of a binary vapor generating system embodying the invention.
Figure 3:
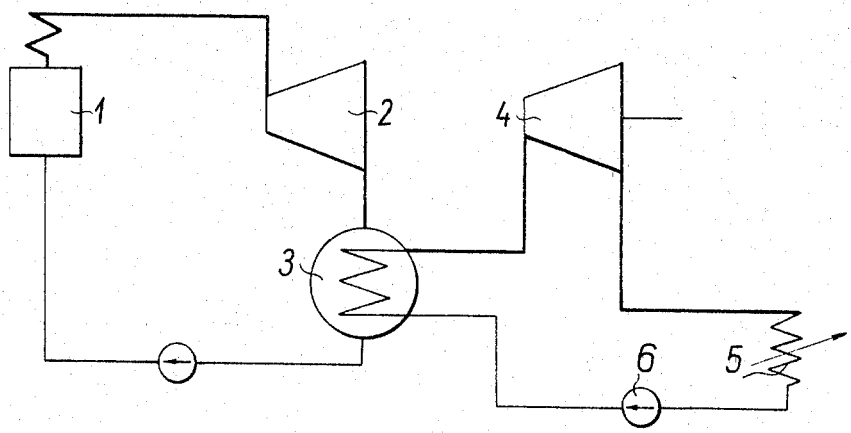
FIG. 3 is a schematic flow diagram of a binary vapor generating system embodying the present invention.

The general design and the manner of operation of a binary vapor generating system embodying the invention will be understood best by reference to FIG. 3. Steam generated in a vapor generator 1 is fed to a steam turbine 2, and the steam may be superheated although, to simplify the disclosure, a superheater has not been illustrated. Steam expanded in turbine 2 is discharged to a heat exchanger 3 connected to the outlet of turbine 2, wherein the steam is condensed under pressure. Due to the condensation of the steam under pressure, auxiliary apparatus such as vacuum pumps, their condensers, and so forth, hitherto necessary for producing a vacuum in the condenser, are not needed. Correspondingly, such condensation under pressure results in decreases in the dimensions of the steam turbine, and in the discharge losses of the exhaust steam, such that unit outputs in excess of 500 to 600 megawatts for each turbine may be attained efficiently.

In heat exchanger 3, the heat of the exhaust steam is used to vaporize a colder fluid medium such as, in the illustrated example, ammonia. Such vaporization takes place at a temperature level which is less than that of the exhaust steam by the temperature differential requisite for heat transfer. The ammonia vapors generated in heat exchanger 3 are expanded in an ammonia vapor turbine 4 particularly designed for operation by expansion of ammonia vapor. The ammonia vapor is expanded from the saturation pressure corresponding to the vaporization temperature to a pressure which is governed by the condensation temperature of an air condenser whose cooling temperature is governed by the ambient temperature of the atmospheric air. If the exhaust steam from turbine 2 is still at a superheated temperature after expansion, the extra heat can be utilized to superheat the ammonia.

Ammonia vapor exhausted from turbine 4 is condensed in an air-cooled ammonia condenser 5, and the condensed and liquified ammonia is returned to heat exchanger 3 by means of a suitable liquid ammonia feed pump 6. Since the pressure of the ammonia, even at a condensation temperature of, for example, minus 30° C., is higher than one absolute atmosphere, there is no need for any vacuum maintaining installation. This eliminates any possibility of air contamination in either the water-vapor circulating stage or the ammonia circulating stage. The specific volume of the ammonia vapor is several hundred times smaller than the specific volume of water vapor saturated at the same temperature. Consequently, the necessary volume of the ammonia vapor turbine is about two orders of magnitude less than that of a steam turbine of the same output capacity, even considering the fact that ammonia vapor has a thermal gradient about three times as low under the same temperature differential.

The use of an ammonia vapor turbine in the lower temperature stage of the binary vapor generating system, as compared with the use of a steam turbine in such stage, results in a reduction in the requisite size or volume of the turbine of such stage by an order of magnitude such that the size or volume are only one-one hundred those of a lower temperature stage turbine utilizing steam. Expressed differently, the turbine used in the low temperature stage of the system may have a discharge cross section which is a maximum of one-tenth of the requisite discharge cross section of a steam turbine designed for the same output at the same temperature level. In actual practice, this means that the invention makes possible the elimination of the low pressure stage of a steam turbine, which is the greatest obstacle to boosting the unit output. For this reason, the system of the invention may be used not only with air condensation of the low temperature stage exhaust but also with water condensation of the low temperature stage exhaust, since, on the one hand, a smaller turbine, in terms of size per unit output, is more economical and, on the other hand, the unit output can be substantially increased.

Utilizing air condensation of the low temperature stage exhaust eliminates all possible risk of damage due to freezing. This further makes possible the elimination of equipment hitherto found necessary in order to prevent damage by freezing when using air condensation for the exhaust of steam turbines.

While specific embodiments of the invention have been shown and described in detail to illustrate the application of the principles of the invention, it will be understood that the invention may be embodied otherwise without departing from such principles.

What is claimed is:

1. A plural fluid medium vapor generating system comprising, in combination, a first stage having a substantially closed circulation path containing a first fluid medium having relatively high vaporization and condensation temperatures, and including first vaporizing means, a first heat engine, and first condensing means connected between the exhaust of said heat engine and the inlet of said vaporizing means; and a second stage having a substantially closed circulation path containing a second fluid medium whose critical temperature is below the critical temperature of said first fluid medium and whose freezing point is substantially less than the prevailing lowest ambient air temperature and substantially less than the freezing temperature of water, and including second vaporizing means, a second heat engine, and air-cooled second condensing means connected between the exhaust of said second heat engine and the inlet of said second vaporizing means; said first condensing means and said second vaporing means being in heat exchange relation to utilize the heat content of the first medium exhausted from said first heat engine to vaporize said second medium.

2. A plural fluid medium vapor generating system, as claimed in claim 1, in which the pressure in said first condensing means is at least equal to the atmospheric pressure.

3. A plural fluid medium vapor generating system, as claimed in claim 1, in which said first fluid medium is water and said second fluid medium is a refrigerant.

4. A plural fluid medium vapor generating system, as claimed in claim 3, in which said refrigerant is ammonia.

5. A binary vapor generating system comprising, in combination, a first stage having a substantially closed circulation path containing water, and including a first vaporizing means, a first heat engine, and first condensing means connected between the outlet of said heat engine and the inlet of said vaporizing means; and a second stage having a substantially closed circulation path containing a second fluid medium having a critical temperature less than that of water and a freezing point substantially less than the prevailing lowest ambient air temperature and substantially less than the freezing temperature of water, and including a second vaporizing means, a second heat engine, and air-cooled second condensing means connected between the exhaust of said second heat engine and the inlet of said second vaporizing means; said first condensing means and said second vaporizing means being in heat exchange relation whereby the heat of the exhaust steam is utilized to vaporize said second medium.

6. A binary vapor generating system, as claimed in claim 5, in which the pressure in said second condensing means is at least equal to the ambient atmospheric pressure even at such prevailing lowest ambient air temperature.

7. A binary vapor generating system, as claimed in claim 5, in which said second heat engine is a turbine having an exhaust cross section not in excess of one-tenth of the exhaust cross section of a steam turbine having the same output at the same temperature level.

8. A plural fluid medium vapor generating system, as claimed in claim 5, in which said second fluid medium is ammonia.

References Cited by the Examiner
UNITED STATES PATENTS 2,568,787    9/1951    Bosch _____ 60—39.18 X

FOREIGN PATENTS 10,416    1901    Great Britain.

MARTIN P. SCHWADRON, *Primary Examiner.*

ABRAM BLUM, ROBERT R. BUNEVICH,
*Examiners.*

MARK NEWMAN, S. N. GARBER,
*Assistant Examiners.*